Patented Jan. 13, 1953

2,625,533

UNITED STATES PATENT OFFICE 2,625,533

VINYL COMPOSITIONS STABILIZED AGAINST CHANGES IN COLOR

Francis J. Williams, Port Washington, and John G. Hendricks, Brooklyn, N. Y., assignors to National Lead Company, New York, N. Y., a corporation of New Jersey No Drawing. Application March 2, 1948, Serial No. 12,687

3 Claims. (Cl. 260—45.75)

This invention relates to vinyl resin compositions and more particularly to such compositions stabilized against the degradation caused by exposure to elevated temperatures and moisture. The compositions are particularly stabilized against darkening of color.

Compounding and processing of vinyl resins into molded and extruded sheet stocks and also in various coating compounds, often involves subjecting the compositions to varied degrees of heat. Furthermore, during the subsequent life of the finished article it may be subjected to further exposure to heat and moisture or combinations thereof and degradation of physical properties including color, is often apparent. Such degradation may be caused by deterioration of both the plastic resin and the plasticizer constituents of the composition. To prevent such deterioration, it has previously been suggested to incorporate certain ingredients in the composition which would have the effect of arresting the auto-catalytic reactions responsible. A considerable number of compounds have been suggested for this purpose and are commonly termed vinyl resin stabilizers. Such stabilizers as have heretofore been proposed have generally not resulted in retention of color and compositions even though presumably stabilized according to prior art methods, when subjected to heat have changed from an ordinary white or light ivory color to dark brown or black.

This invention, therefore, has for its object, provision of a vinyl resin composition containing an effective color stabilizer. A further object of this invention is to provide a vinyl resin composition of substantially white or light color which shall retain such color after exposure to heat. It is a further object of this invention to provide a vinyl resin compositon in which the physical properties thereof including color, shall be more effectively stabilized than by processes heretofore known.

This invention in its broadest aspect contemplates the provision of a vinyl resin composition containing as a stabilizer hydrous tribasic lead sulfate. This compound may be represented by the general formula $$3PbO.PbSO_4.H_2O$$

and its production is described in U. S. Patent 2,249,330.

Hydrous tribasic lead sulfate is adapted for use in vinyl resin compositions for all types of usage excepting those specifications where transparency of the product is an essential characteristic.

Tribasic lead sulfate has a refractive index of 2.1 and imparts opacity, when compounded in vinyl compositions. It is adapted for use in compositions which comprise principally polymerized vinyl and vinylidene chloride, also vinyl chloride-acetate polymers and also mixtures of these materials. In addition, other polymers and co-polymers, such as butadiene-acrylonitrile, butadiene-styrene co-polymers and such other materials as neoprene and natural rubber may form part of the vinyl composition. The term vinyl resin composition is intended to include all such compositions, which may or may not include plasticizers intended to impart flexibility, fillers, and other ingredients included for specific purposes.

The hydrous tribasic lead sulfate is effective as a stabilizer when used generally from .5% to 15% of the weight of the vinyl resin portion of the composition. For most applications, it will be found advantageous to use about 5% hydrous basic lead sulfate. For uses where excessive temperature conditions are not likely to be encountered, amounts in the lower part of the useful range may be employed, while, if the composition is required to resist severe conditions the higher portion of the range will be found preferable. It may be used in any of the vinyl and vinylidene chloride compositions mentioned since it produces compounds which have excellent resistance to the aging effects of heat and moisture, and at the same time which have good color, electrical and other physical characteristics. In this connection, we have found that one of the prime virtues of hydrous tribasic lead sulfate is its lack of reactivity with plasticizers commonly used, which latter constitute as much as 40% by weight of flexible vinyl compositions. The tendency to be relatively inert to plasticizers is an unique feature of hydrous tribasic lead sulfate, a characteristic not possessed by prior art stabilizing materials. In addition, the stabilizer of this invention has a minimum tendency to form soluble salts of the degradation products of vinyl and vinylidene compounds and, therefore, enhances the value of these materials by imparting to them relative freedom from bad aging characteristics such as the degradation of the compounds themselves, or the releasing of organic soluble and water-soluble constituents.

The hydrous tribasic sulfate stabilizer of this invention may be compounded into the compositions described in the usual manner known to those skilled in the art. No particular methods of incorporation are required.

The following example will serve to illustrate a composition according to this invention of which many types are possible by varying the type of vinyl or vinylidene compound, or the type of plasticizer and the amount of tribasic lead sulfate stabilizer used.

*Example 1*

A composition was mixed and compounded in the usual manner by using the following proportions by weight:

| | Parts |
|---|---|
| Polyvinyl chloride-acetate | 65 |
| Dioctyl phthalate | 35 |
| Tribasic lead sulfate | 3 |

When sheeted to a thickness of approximately 0.1 inch, the product of Example 1 was found to have the following physical properties:

TABLE I

*Example 1*

| | | After 5 days' exposure at 121° C. in air |
|---|---|---|
| Color | white | light yellow. |
| Tensile strength, p. s. i | 2,500 | 1,740. |
| Percent elongation | 340 | 200. |
| Hardness (Shore A) | 82 | 87. |
| Resistivity, Ohms/cm | $4.1 \times 10^{12}$ | |

It will be noted that the product of Example 1 after five days' exposure to a temperature of 250° F. had been affected in color only to the extent that the original white had yellowed slightly.

For purposes of comparison, formulations of vinyl chloride-acetate resin using in one case hydrous tribasic lead sulfate and in the other a well known commercial stabilizer for such resins, were made according to the following example:

*Example 2*

| | A | B |
|---|---|---|
| | Parts | Parts |
| Polyvinyl chloride-acetate | 65 | 65 |
| Dioctyl phthalate | 35 | 35 |
| Tribasic lead sulfate | 3.25 | |
| Di-sodium phosphate | | 3.25 |

After being mixed, compounded and sheeted, these materials were exposed in an air oven at 300° F. for the number of hours shown in Table II and the color noted.

TABLE II

| Hours Exposed | Color | |
|---|---|---|
| | A | B |
| 0 | white | light tan. |
| 1 | very light off-white | light yellow tan. |
| 2 | off-white | raw sienna. |
| 3 | light ivory | Do. |
| 4 | do | Do. |
| 5 | do | golden brown. |
| 6 | do | dark red. |
| 7 | do | dark reddish brown. |
| 8 | do | very dark red. |
| 9 | do | black. |

The unique and improved color stabilizing action of the anhydrous tribasic lead sulfate in Example A above is demonstrated by retention of a light ivory color under conditions where a similar vinyl composition stabilized with a previously considered effective stabilizer turned black. The resin compositions stabilized with hydrous tribasic lead sulfate were originally an opaque white. On exposure to air at 300° F. the composition gradually changed in color. After nine hours, the samples were an opaque off-white-tan. The compositions stabilized with the commercial stabilizer were initially a translucent light tan. On exposure in air at 300° F. this color darkened perceptibly. After six hours' exposure, there was a pronounced dark reddish discoloration and longer exposure yielded very dark red and black opaque products.

While the composition of this invention has been described and illustrated by the examples shown, it is not intended to be strictly limited thereto and other modifications and variations may be employed as limited by the following claims.

We claim:

1. A vinyl chloride resin composition characterized by color stability at elevated temperature when formed into sheets of substantial thickness containing from .5% to 15% hydrous tribasic lead sulfate.

2. A vinyl chloride resin composition characterized by color stability at elevated temperature when formed into sheets of substantial thickness containing about 5% hydrous tribasic lead sulfate.

3. A vinyl chloride resin composition characterized by color stability at elevated temperature when formed into sheets of substantial thickness comprising a vinyl compound, a plasticizer and from .5% to 15% hydrous tribasic lead sulfate.

FRANCIS J. WILLIAMS.
JOHN G. HENDRICKS.

REFERENCES CITED

The following references are of record in the file of this patent:

UNITED STATES PATENTS

| Number | Name | Date |
|---|---|---|
| 2,141,126 | Doolittle | Dec. 20, 1938 |
| 2,249,330 | Stewart | July 15, 1941 |

OTHER REFERENCES

Mellor: "Comprehensive Treatise on Inorganic and Theoretical Chemistry," pages 817 and 818, vol. 7, published in 1927 by Longman's Green and Co., N. Y.